United States Patent
Uozumi et al.

(10) Patent No.: US 7,815,141 B2
(45) Date of Patent: Oct. 19, 2010

(54) FILAMENT WINDING APPARATUS

(75) Inventors: Tadashi Uozumi, Kyoto (JP); Motohiro Tanigawa, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 165 days.

(21) Appl. No.: 12/259,897

(22) Filed: Oct. 28, 2008

(65) Prior Publication Data

US 2009/0127373 A1   May 21, 2009

(30) Foreign Application Priority Data

Nov. 15, 2007   (JP) .............................. 2007-296693

(51) Int. Cl.
*B21C 47/02*   (2006.01)
(52) U.S. Cl. ................. 242/445.1; 242/438; 242/440.1; 242/441.1
(58) Field of Classification Search ................. 242/437, 242/438, 439, 440.1, 441.1, 445.1, 447.1
See application file for complete search history.

(56) References Cited

U.S. PATENT DOCUMENTS

| | | | | |
|---|---|---|---|---|
| 3,255,976 A | * | 6/1966 | Mede | 242/436 |
| 3,282,757 A | * | 11/1966 | Brussee | 156/69 |
| 3,378,427 A | * | 4/1968 | McClean | 156/431 |
| 3,380,675 A | | 4/1968 | Baxter, Jr. et al. | |
| 3,970,495 A | * | 7/1976 | Ashton et al. | 156/162 |
| 4,077,828 A | * | 3/1978 | Strom | 156/429 |
| 4,172,562 A | * | 10/1979 | Smith | 242/439.5 |
| 4,251,036 A | * | 2/1981 | McLain | 242/444 |
| 4,448,015 A | * | 5/1984 | Usui | 242/441.3 |
| 4,610,402 A | * | 9/1986 | Corbett et al. | 242/436 |
| 4,631,101 A | * | 12/1986 | Rix | 156/175 |
| 6,146,481 A | * | 11/2000 | Avni et al. | 156/169 |

FOREIGN PATENT DOCUMENTS

| | | |
|---|---|---|
| EP | 0370109 A1 | 5/1990 |
| JP | 2002-046940 | 2/2002 |
| JP | 2004-314550 | 11/2004 |
| JP | 2005-154908 | 6/2005 |

OTHER PUBLICATIONS

European Search Report for corresponding European application 08018004.5-2307 lists the references above.

* cited by examiner

*Primary Examiner*—Emmanuel M Marcelo
(74) *Attorney, Agent, or Firm*—Hogan Lovells US LLP

(57) ABSTRACT

A filament winding apparatus that efficiently and orderly winds a fiber bundle with respect to a mandrel in a short period of time. A supporting board supports the mandrel, and a helical winding head supplies and guides the fiber bundle towards the mandrel. The helical winding head includes a group of guide tubes radially arranged on a circumferential surface of a guide ring, and a tube operation mechanism that reciprocates the guide tube along a tube axis center direction. The guide tube is moved closer to a circumferential surface of the dome part when the guide tube is facing a dome part of the mandrel such that the distance between the winding position of the fiber bundle and the guide tube at the dome part can be reduced, and the fiber bundle is orderly wound according to an appropriate winding trajectory.

16 Claims, 11 Drawing Sheets

FILAMENT WINDING APPARATUS

CROSS-REFERENCE TO RELATED APPLICATIONS

This application claims the benefit of priority under 35 USC 119 of Japanese application no. 2007-296693, filed on Nov. 15, 2007, which is incorporated herein by reference.

BACKGROUND OF THE INVENTION

1. Field of the Invention

The present invention relates to a filament winding apparatus equipped with a helical winding device, and a modified form of a supply structure of a fiber bundle configured by a guide ring and a guide tube arranged in a ring thereof.

2. Description of the Related Art

A pressure container is formed through a filament winding method by a reinforcement layer wound around a circumferential surface of a hollow mandrel. In most cases, the mandrel integrally includes a middle cylindrical part continuing to dome parts at both left and right ends of the cylindrical part. A fiber bundle is wound around the cylindrical part and the left and right dome parts to form the reinforcement layer. The fiber bundle is supplied to the mandrel by way of numerous guide bodies (see, for example, Japanese Laid-Open Patent Publication No. 2004-314550). The guide body is arranged on an array head that slides in a reciprocating manner along an axis center of the mandrel, and is arranged in a dispersed manner around the mandrel. The fiber bundle is moved and guided by the guide body, and is supplied to the mandrel by way of a fiber-spreading ring that is concentric with the mandrel. During the operation of the winding apparatus, the array head is reciprocated while rotatably driving the mandrel, so that the fiber bundle supplied from the guide tube is wound around the mandrel, thereby forming the reinforcement layer.

The supply position of the fiber bundle with respect to the mandrel may be changeable (see, for example, Japanese Laid-Open Patent Publication No. 2005-154908). Here, the supply position of the fiber bundle is changed by rotationally displacing a yarn feeding unit between a case of winding the fiber bundle around the cylindrical part of the mandrel and a case of winding the fiber bundle around the dome part. The yarn feeding unit is configured by a supporting part supported in a freely rotating manner, an exit guide arranged at a distal end of the supporting part, and the like. The supply position of the fiber bundle can be changed by the rotationally displaced amount of the exit guide. Similarly, it is known to displace a feed eye that supplies and guides the fiber bundle towards the mandrel in a radius direction of the mandrel at the dome part of the mandrel (see, for example, Japanese Laid-Open Patent Publication No. 2002-46940). In either case, the displacement amount of the exit guide and the feed eye is very limited.

The winding apparatuses according to Japanese Laid-Open Patent Publication Nos. 2005-154908 and 2002-46940 wind the fiber bundle around a circumferential surface of a mandrel by the cooperative action of the rotatably driven mandrel, and one yarn supply unit (or feed eye) reciprocated along the axis center of the mandrel. Thus, forming a reinforcement layer by repeatedly performing hoop winding and helical winding requires a great amount of time, and the pressure container is thereby not efficiently formed. By contrast, in Japanese Laid-Open Patent Publication No. 2004-314550, a group of fiber bundles are simultaneously supplied to the mandrel, such that the winding process is performed in a shorter period of time and the pressure container is more efficiently manufactured.

In Japanese Laid-Open Patent Publication No. 2004-314550, however, the supply position of the fiber bundle with respect to the mandrel is always constant for the cylindrical and dome parts since the fiber bundle is supplied to the mandrel by way of a fiber-spreading ring. At the semispherical dome part, the diameter of the mandrel gradually decreases towards a mouth part, and the winding trajectory of the fiber bundle tends to shift to the mouth part side. Thus, it becomes difficult to orderly wind the group of fiber bundles around the dome part.

SUMMARY OF THE INVENTION

The present invention provides a filament winding apparatus that efficiently performs a winding process of a fiber bundle with respect to a mandrel in a short period of time, and orderly performs the winding of the fiber with respect to a dome part of the mandrel with the supply position of the fiber bundle changed between cylindrical and dome parts of the mandrel.

The filament winding apparatus according to one embodiment of the present invention includes a supporting board that supports a mandrel, and a helical winding head that supplies and guides a fiber bundle towards the mandrel. The helical winding head includes a guide ring concentrically supported at a periphery of the mandrel, a group of guide tubes radially arranged along a circumferential direction of the guide ring, and a tube operation mechanism that reciprocates the guide tube along a tube axis center direction. The guide tube is operated by the tube operation mechanism to move closer to a circumferential surface of the dome part of the mandrel when the guide tube is facing the dome part.

The movement trajectory when the guide tube is operated with the tube operation mechanism to move closer to the circumferential surface of the dome part of the mandrel is a curved line form along an outer contour line of the dome part.

A circular opening allowing reciprocating movement of the mandrel is formed in a fixed frame that is upstanding and fixed on a mount. The guide ring is fixed to a circumferential edge wall of the opening. A tube holder arranged on the guide tube is supported in a freely reciprocating sliding manner by a guide groove formed in the guide ring. The tube operation mechanism is arranged between the fixed frame and the tube holder.

The tube operation mechanism is configured by a rack arranged on the tube holder, a pinion gearing with the rack, a power transmission mechanism that transmits rotational power of a motor to a group of pinions, and a control circuit that controls a drive state of the motor.

In the present invention, the helical winding head is configured by the guide ring, the group of guide tubes arranged in the circumferential direction of the guide ring and the tube operation mechanism that reciprocates the guide tube, and the winding process is performed while simultaneously supplying the group of fiber bundles to the mandrel. When the guide tube is facing the dome part of the mandrel, the guide tube is operated by the tube operation mechanism to move closer to the circumferential surface of the dome part and to supply the fiber bundle in the vicinity of the circumferential surface of the dome part. Thus, when the guide tube is moved closer and the fiber bundle is supplied in the vicinity of the circumferential surface of the dome part, the distance between the winding position of the fiber bundle and the guide tube at the dome part is reduced, and thus the fiber bundle can be orderly wound according to an appropriate winding trajectory. Therefore, according to the filament winding apparatus of the present invention, the winding of the fiber bundle with respect to the dome part is efficiently performed in an orderly fashion and a high quality reinforcement layer is formed.

The guide tube can be projected and retreated while matching the change in shape of the dome part of the mandrel by setting the movement trajectory of the guide tube when being operated with the tube operation mechanism to move closer to the curved line form along the outer contour line of the dome part of the mandrel. The spacing between the guide tube and the dome part is always set constant, such that the winding process of the fiber bundle at the dome part is further appropriately performed. By contrast, if the movement trajectory of the guide tube is changed to a linear form, the spacing between the guide tube and the dome part continuously changes, and the winding position of the fiber bundles tends to easily shift.

The peripheral structure of the guide tube can be simplified while avoiding concentrated arrangement of equipment at the periphery of the guide tube by supporting the tube holder, which is integral with the guide tube, in a freely sliding manner by the guide groove of the guide ring, and arranging the tube operation mechanism between the fixed frame and the tube holder. For instance, the peripheral structure of the guide tube can be simplified and the concentration of equipment inhibited by arranging the tube operation mechanism in a dispersed manner using the surface wall of the fixed frame. If the peripheral structure of the guide tube is simplified, tasks such as setting and replacing of the fiber bundle can be easily performed without being disturbed by the equipment.

According to the tube operation mechanism configured by the rack arranged on the tube holder, the pinion that reciprocates the rack and the power transmission mechanism that transmits the motor power to the pinion, the group of guide tubes can be projected and retreated together in synchronization to change the supply position of the fiber bundle. Therefore, the winding process of the fiber is further orderly performed to obtain a higher quality reinforcement layer without variation in the fiber bundle supply position at the individual guide tube.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

Example

Figure 1:
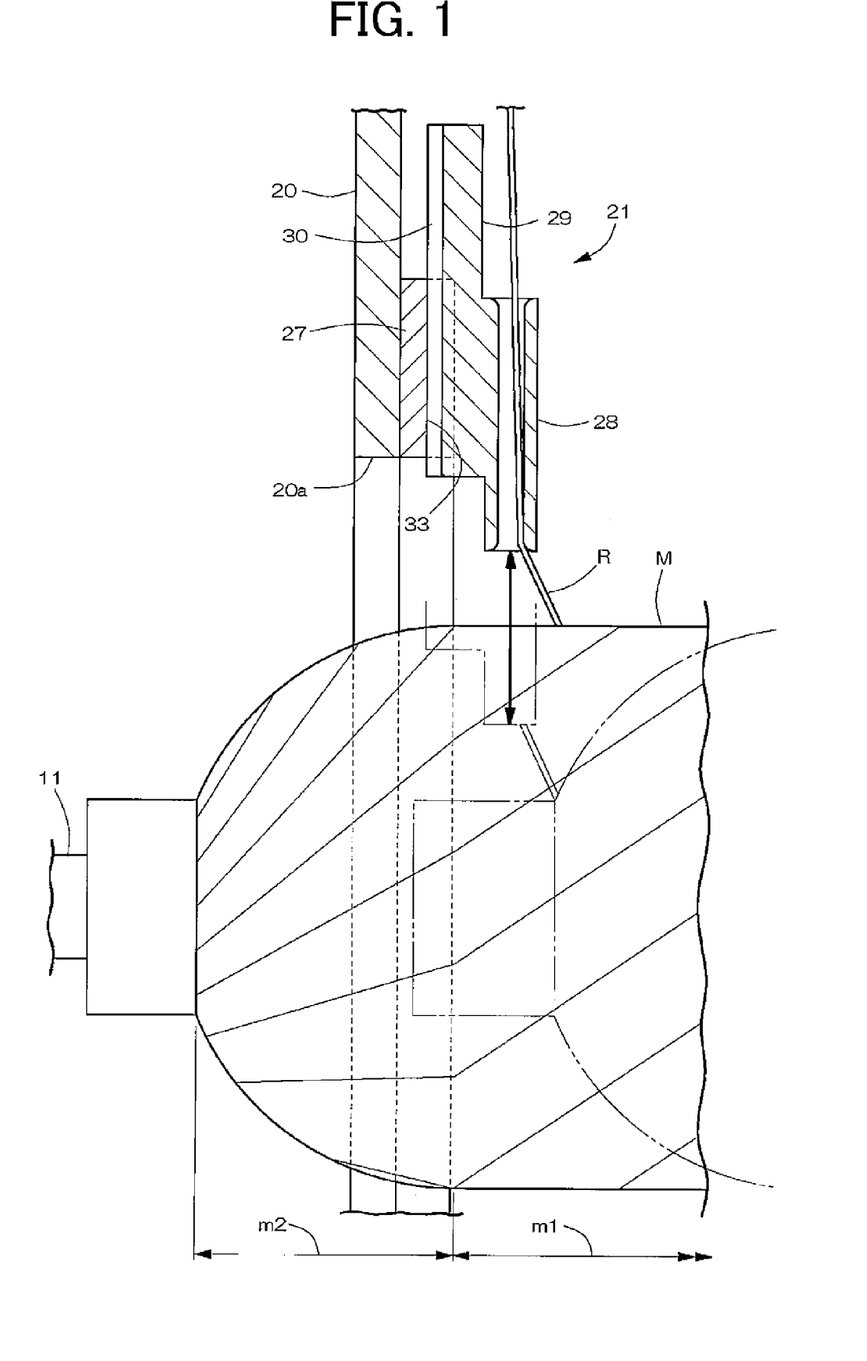
FIG. 1 is a cross-sectional view of a helical winding head according to the present invention taken along line B-B of FIG. 6.
Figure 2:
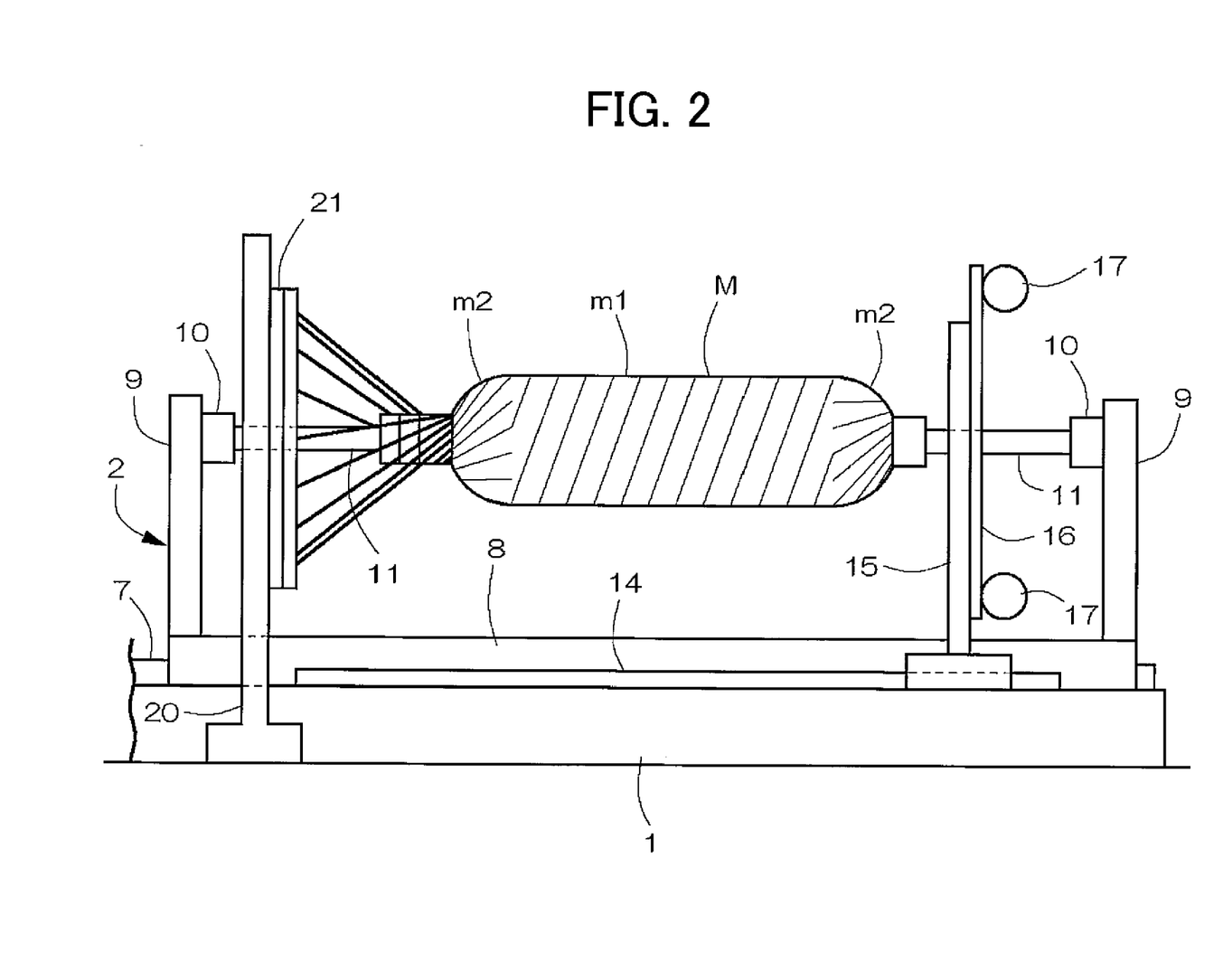
FIG. 2 is a front view of a filament winding apparatus according to the present invention.
Figure 3:
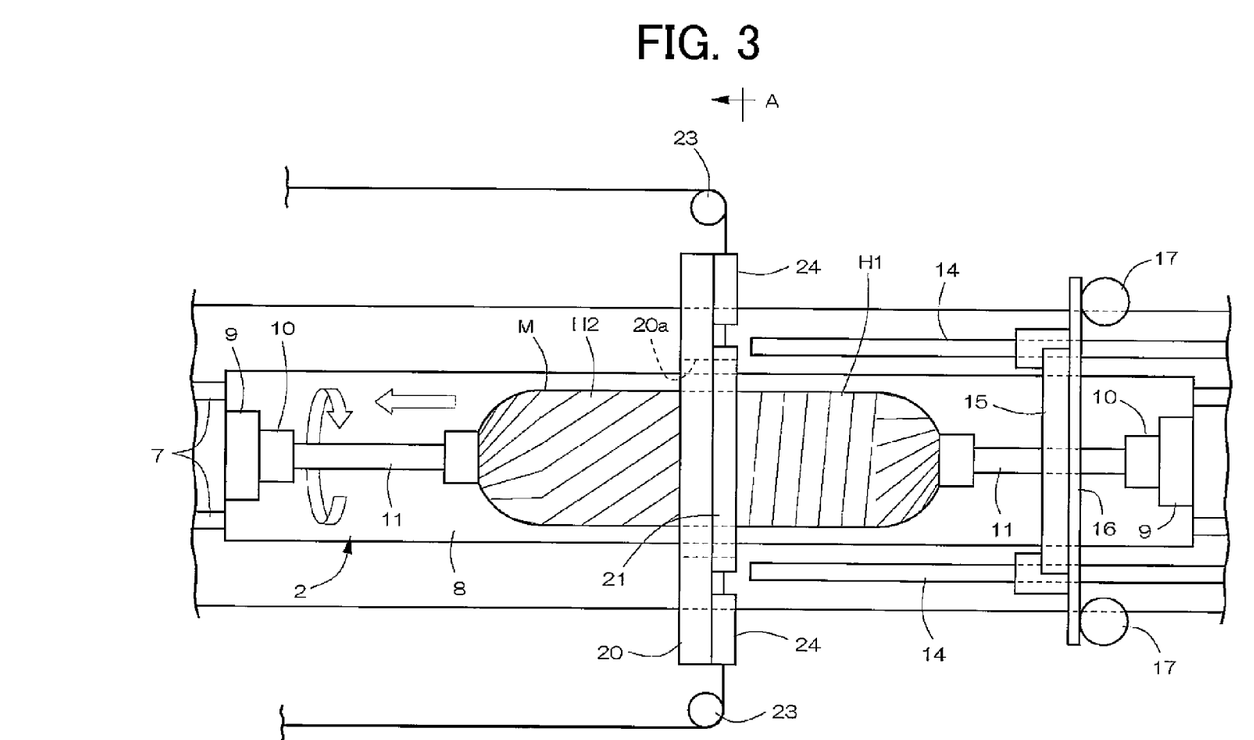
FIG. 3 is a plan view of the filament winding apparatus.

FIGS. 1-9 show an example of a filament winding apparatus (hereinafter simply referred to as a winding apparatus) according to the present invention. In FIGS. 2 and 3, the winding apparatus is configured by a fiber bundle supply structure and a winding device. The winding device comprises a supporting board 2 that is arranged on an upper part of a mount 1 that is long in a left and right direction and that supports a mandrel M; a hoop winding device; a helical winding device; and a mandrel replacing device. The supporting board 2 and the hoop winding device are driven by a drive mechanism in a reciprocating manner along a longitudinal direction of the mount 1. The helical winding device is arranged at a central position of the mount 1, and feeds and guides a fiber bundle R from a group of creels supported by the fiber bundle supply structure to the mandrel M.

The mandrel M, in a case where the final product is a pressure container, is a metal container including high strength aluminum material, stainless material, or the like. Alternatively, the mandrel M may be a plastic container. The mandrel M of FIG. 2 integrally includes a middle cylindrical part m1, dome parts m2 continuing at both left and right ends of the cylindrical part m1, and a mouth part arranged in a projecting manner at the apex of the dome part m2. The fiber bundle R is a bundle of glass or carbon fiber impregnated in advance with a thermosetting resin material and wound around the creel. The fiber bundle R fed may be supplied from the creel to the helical winding device after being impregnated with resin.

The supporting board 2 comprises a base 8 that is moved and guided by a pair of front and back rails 7 of the mount 1, supporting arms 9 arranged in an upstanding manner at both side ends of the base 8 and chucks 10 arranged on opposing faces at the upper ends of the supporting arms 9. A pair of attachment jigs 11 are fixed on the left and right sides of the mandrel M. Attachment jigs 11 are gripped and fixed by the chucks 10 so that the mandrel M is supported between the left and right supporting arms 9. One chuck 10 is rotatably driven by a drive structure to also rotate the mandrel M. The supporting arms 9 are assembled so as to be able to be laid down from the illustrated standing orientation to a laid orientation with respect to the base 8 to facilitate the replacement of the mandrel M.

The hoop winding device comprises a frame 15 moved and guided by a rail 14 of the mount 1, a disc-shaped wrapping table 16 supported in a freely rotating manner by the frame 15 and a drive mechanism that rotatably drives the wrapping table 16. A plurality of bobbins 17 that supply the fiber bundle in hoop winding are arranged at equal intervals along the peripheral edge of one side of the wrapping table 16. A circular opening that allows reciprocating movement of the mandrel M is formed at the middle of a plate surface of the wrapping table 16. With the opening surface of the opening and the mandrel M orthogonal to each other, the entire hoop winding device is reciprocated while rotatably driving the wrapping table 16 so that a hoop wound layer is formed on a circumferential surface of the mandrel M.

Figure 4:
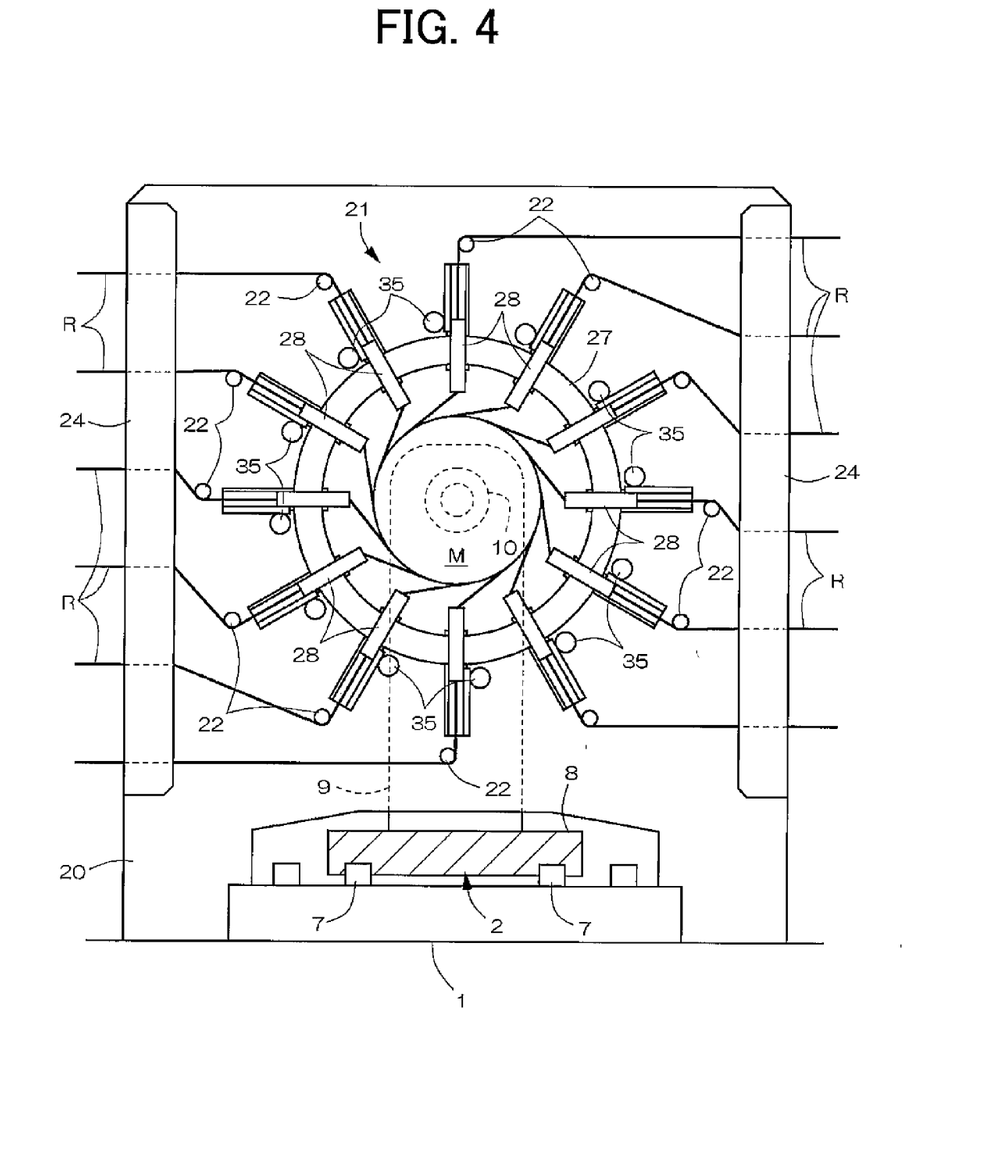
FIG. 4 is a cross-sectional view taken along line A-A of FIG. 3.
Figure 5:
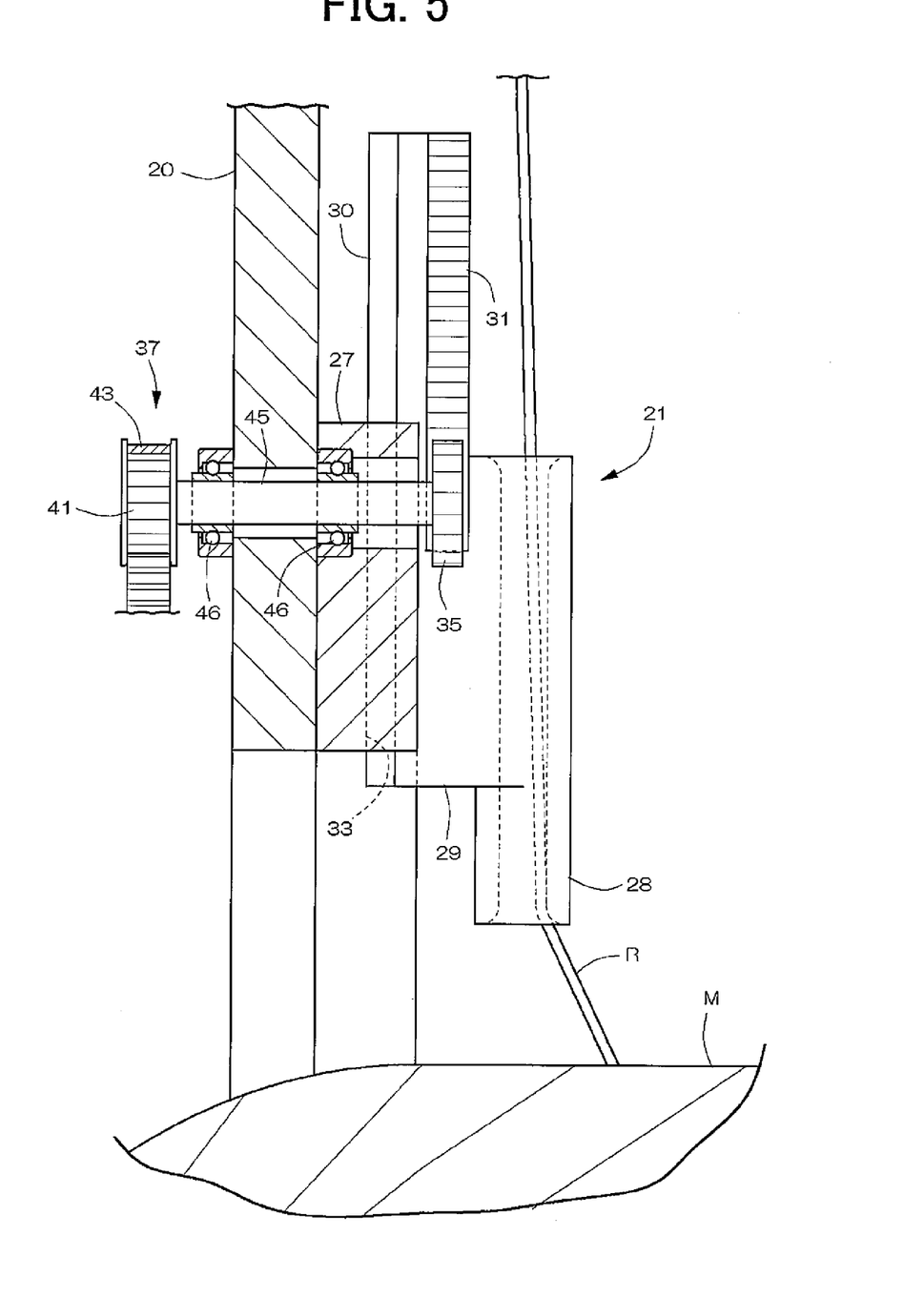
FIG. 5 is a longitudinal section front view showing a tube operation mechanism according to the present invention.
Figure 6:
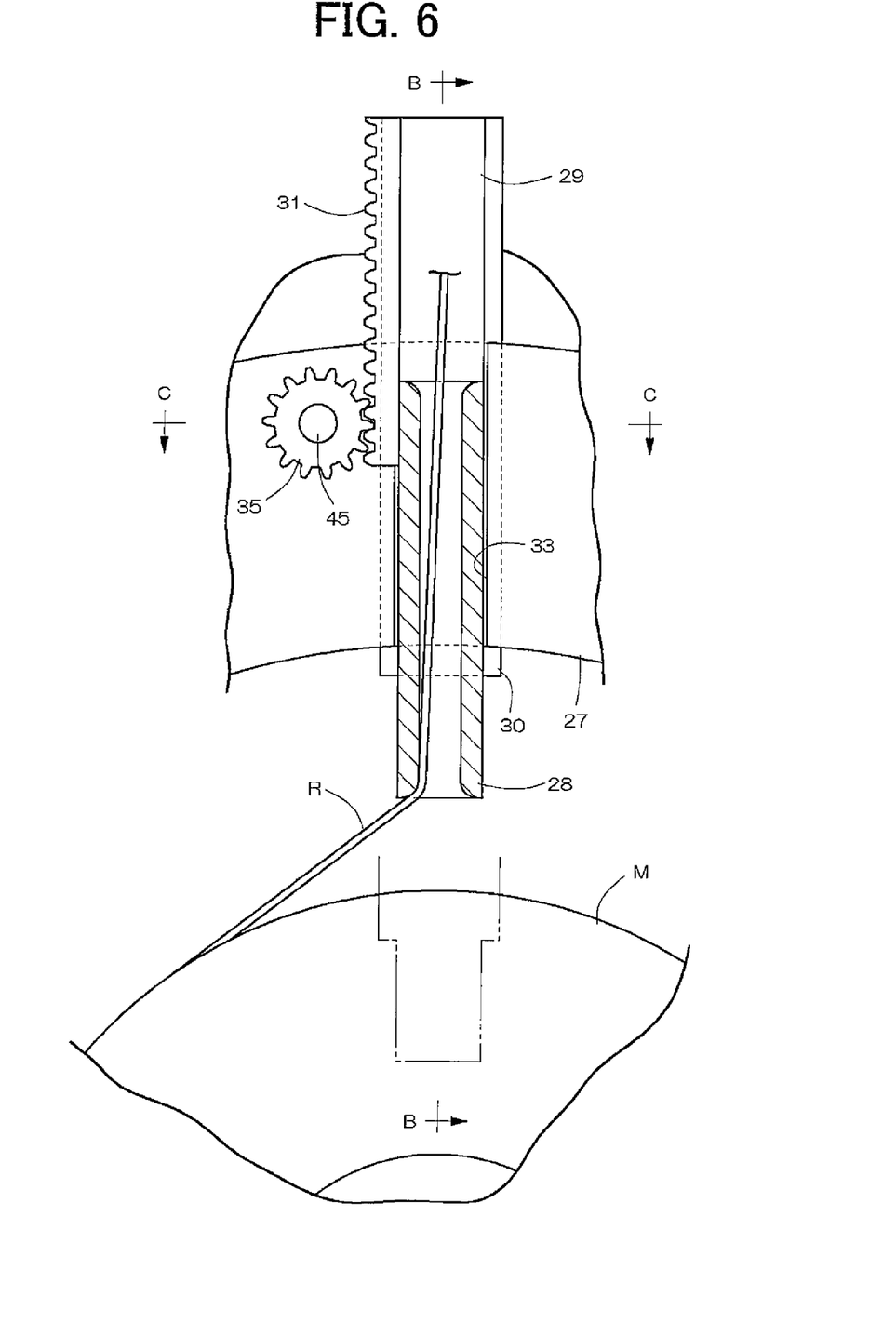
FIG. 6 is a longitudinal section side view showing the tube operation mechanism.
Figure 7:
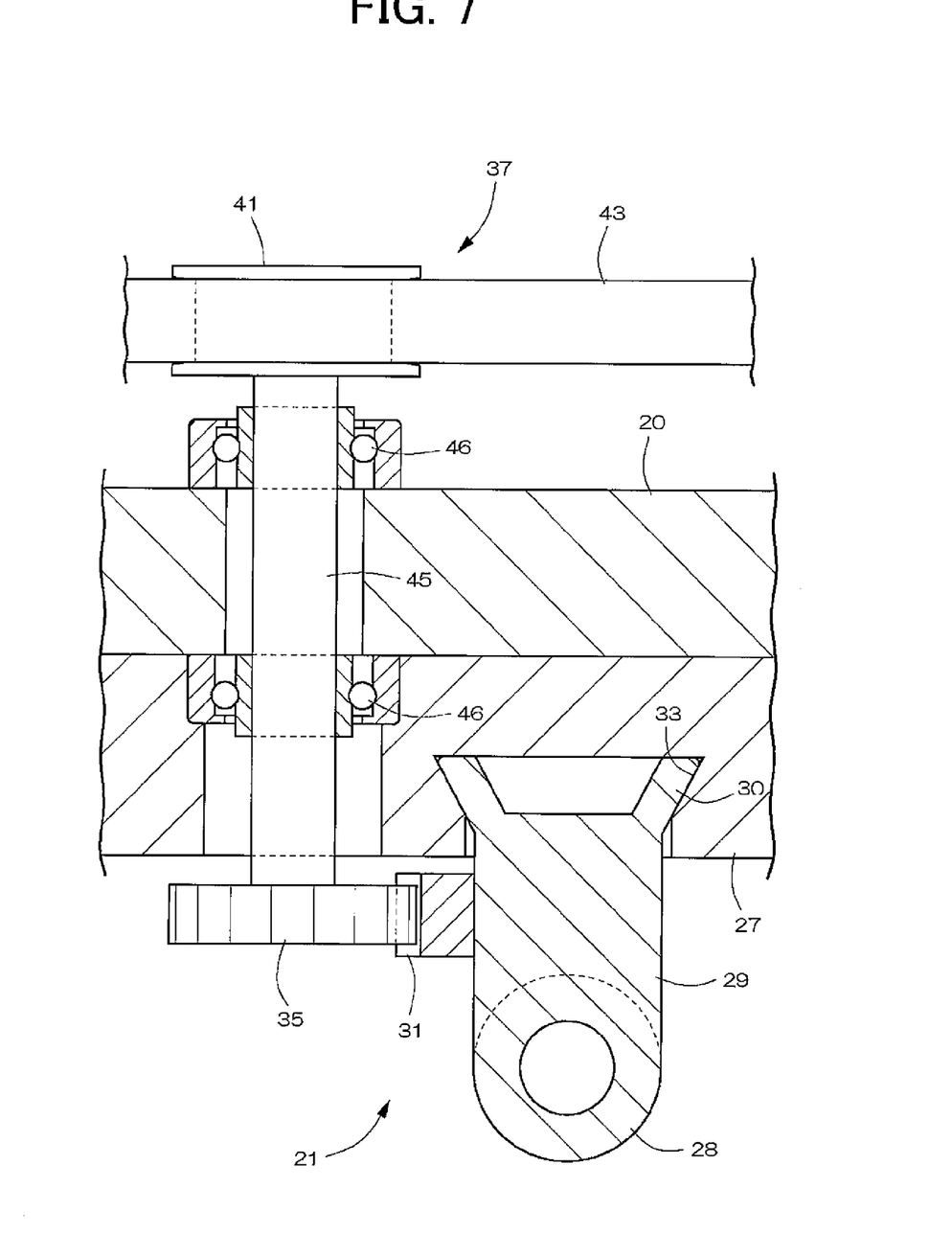
FIG. 7 is a cross-sectional view taken along line C-C of FIG. 6.

In FIGS. 2-4, the helical winding device comprises a fixed frame 20 arranged upstanding on the mount 1, a helical winding head 21 supported by the fixed frame 20 and a guide roller 22 that changes the direction and guides the group of fiber bundles towards the helical winding head 21. A circular opening 20a allowing the reciprocating movement of the mandrel M is formed at the middle of a plate surface of the fixed frame 20 (see FIG. 1), and the guide roller 22 is arranged at a plate surface of the circumference of the opening 20a. The fiber bundle R is supplied from the fiber bundle supply structure and guided towards the helical winding device by a direction-changing roller 23 arranged on both front and back sides of the fixed frame 20, and is then fed to the helical winding head 21 through a tension adjustment structure 24 and the guide roller 22.

The helical winding head 21 comprises a guide ring 27 fixed to a circumferential edge wall on one side of the opening 20a, a group of guide tubes 28 radially arranged at equal intervals along the circumferential direction of the guide ring 27 and a tube operation mechanism that reciprocates the guide tube 28 in a radial direction. As shown in FIG. 4, the fiber bundle R is passed through the tension adjustment structure 24 and is moved and guided to the group of guide tubes 28 through the guide roller 22. To simplify the drawings, only twelve guide tubes 28 are illustrated as attached to the guide ring 27, but actually, several dozens to a hundred and several tens of the groups of guide tubes 28 are attached to the guide ring 27. The appropriate number of fiber bundles R in carrying out helical winding is calculated with the diameter dimension of the mandrel M, as well as the winding width and the winding angle of the fiber bundle R as variables.

The guide tube 28 is a linear round tube, and is supported in a freely reciprocating and sliding manner in the radial direction by the guide ring 27 by way of a tube holder 29 that is integrally arranged with the guide tube 28. The tube holder 29 includes a metal block that is long in an up and down direction. The guide tube 28 is fixed at one side end, and a slide frame 30 having a trapezoidal cross-section is integrally formed at the other side end. A rack 31 that is long in the up and down direction is fixed on a rear surface side of the tube holder 29. The slide frame 30 is supported in a freely reciprocating and sliding manner by a radial guide groove 33 arranged in the guide ring 27, so that the guide tube 28 can advance and retreat and then slide in the radial direction with the tube holder 29.

The tube operation mechanism is arranged between the fixed frame 20 and the tube holder 29 to perform the sliding operation of the guide tube 28. The tube operation mechanism in FIGS. 5-7 comprises the rack 31, a pinion 35 that gears with the rack 31, a power transmission mechanism 37 that simultaneously transmits rotational power of a motor 36 to the group of pinions 35, and a control circuit 38 (FIG. 8) which controls a drive state of the motor 36.

Figure 8:
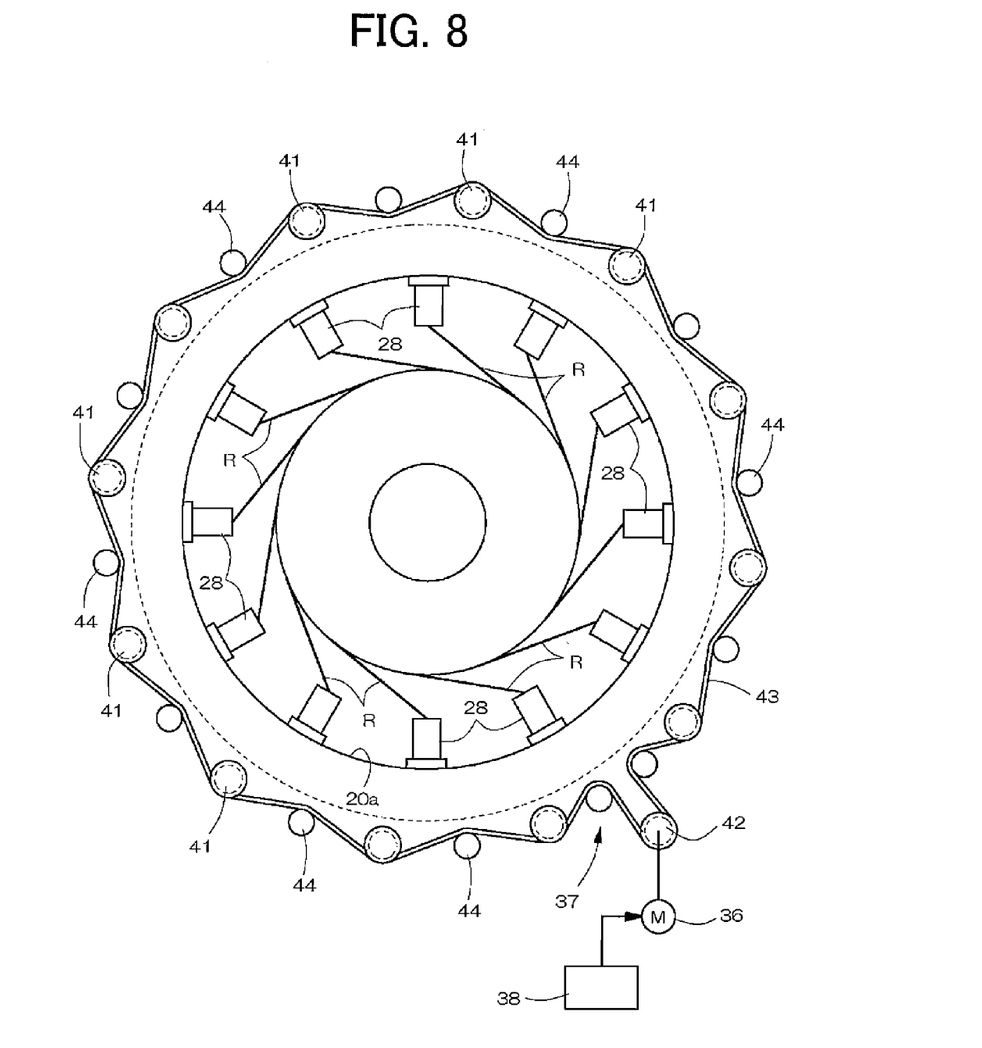
FIG. 8 is a side view of a power transmission mechanism according to the present invention.

As shown in FIG. 8, the power transmission mechanism 37 comprises a group of timing gears 41 arranged in correspondence to each pinion 35, a drive gear 42 that outputs rotational power of the motor 36, and a timing belt 43 wrapped around the gears 41, 42. A guide pulley 44 is axially supported in a freely rotating manner between the timing gears 41 adjacent in the circumferential direction. The pinion 35 and the timing gear 41 are fixed to both ends of a gear shaft 45 passing through the fixed frame 20 in a thickness direction. The gear shaft 45 is supported in a freely rotating manner by a bearing 46 attached to the fixed frame 20 (see FIG. 7). Therefore, the group of pinions 35 is simultaneously driven by normally or reversely driving the motor 36, thereby sliding the tube holder 29 to move closer to or away from the mandrel M.

Basic data such as the diameter of the mandrel M, the length of the cylindrical part m1, and the curved shape of the dome part m2 are input in advance to the control circuit 38. As the winding process progresses, data indicating the total thickness of the hoop wound layer formed around the mandrel Mr the total thickness of the helical wound layer, and the like are stored in the control circuit 38. The control circuit 38 controls a drive state of the motor 36 in relation to this basic data and the state of progress of the winding operation of the fiber R around the mandrel M.

The winding operation of the winding apparatus is now described. When carrying out hoop winding, the wrapping table 16 is positioned at one side end of the cylindrical part m1 of the mandrel M, and the fiber bundle R fed from each bobbin 17 is fixed to the surface of the mandrel M with an adhesive tape. In this state, the frame 15 is moved towards the other side end of the cylindrical part m1 of the mandrel M while rotatably driving the wrapping table 16 to form a first hoop wound layer H1. The frame 15 is then invert moved to the one side end (winding start end side) of the cylindrical part m1 of the mandrel M to form a second hoop wound layer H1. The winding process of forming the hoop wound layer H1 is performed in this manner a necessary number of times.

When forming a helical wound layer H2 on an outer surface of the hoop wound layer H, the hoop winding device is retreated to one side end of the mount 1, as shown in FIG. 2. The supporting board 2 is moved so that a basal end of the mouth part of the mandrel M faces the inner surface of the guide ring 27 of the helical winding device, and the fiber bundle R pulled out from each guide tube 28 is fixed to a circumferential surface of the mouth part with the adhesive tape. In this state, the supporting board 2 is moved at a constant speed while rotatably driving the chuck 10 and the mandrel M to form a helical wound layer H2 on the outer surface of the hoop wound layer H, as shown in FIG. 3.

Figure 9:
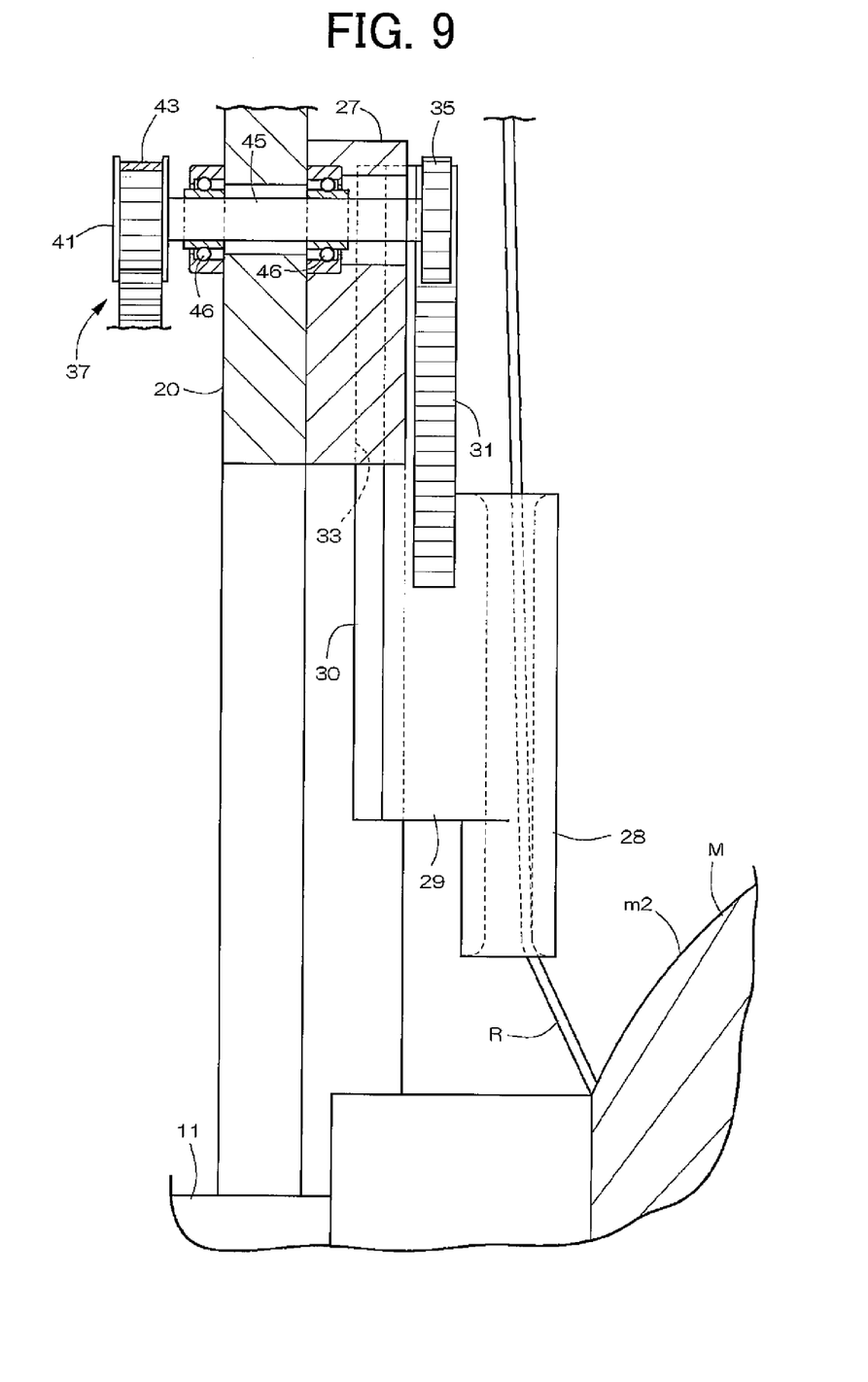
FIG. 9 is a longitudinal section front view showing a state, according to the present invention, in which a guide tube is proximate to a dome part.

In the process of forming the helical wound layer H2, the tube holder 29 is projected and retreated with the tube operation mechanism to supply the fiber bundle R to the cylindrical part m1 and the dome part m2 of the mandrel M under the same condition. In a state of winding the fiber bundle R around the cylindrical part m1 of the mandrel M, the tube holder 29 is held in the standby state shown in FIGS. 1 and 5, and an appropriate amount of spacing is thereby ensured between the guide tube 28 and the mandrel M. In a state of winding the fiber bundle R around the dome part m2 in continuation to the cylindrical part m1, the motor 36 is driven to move the tube holder 29 closer to a circumferential surface of the dome part m2, and an appropriate amount of spacing is thereby ensured between the guide tube 28 and the mandrel M, as shown in FIG. 9.

Furthermore, in cooperation with the movement of the mandrel M in the opposite direction, the motor 36 is reversely driven to move the tube holder 29 away from the circumferential surface of the dome part m2. Thus, in a state where the guide tube 28 faces the cylindrical part m1, the tube holder 29 returns to the standby state described above, and an appropriate amount of spacing is again ensured between the guide tube 28 and the mandrel M. A helical wound layer H2 of a predetermined thickness is formed on the outer surface of the hoop wound layer H1 by repeatedly performing these operations.

The movement trajectory of the guide tube 28 is set to a curved line form lying along the outer contour line of the dome part m2 by matching the spacing of the guide tube 28 and the mandrel M at the cylindrical part m1 and the spacing of the guide tube 28 and the mandrel M at the dome part m2.

For instance, the movement trajectory of the guide tube 28 is a partial circular arc shape if the dome part m2 is a semispherical shape. The diameter dimension of the cylindrical part m1 of the mandrel M gradually increases as the winding process progresses. In correspondence with such increase in the diameter dimension of the cylindrical part m1, the holding position of the guide tube 28 in the standby state can be gradually shifted radially outward.

After the series of helical winding processes are terminated, the fiber bundle R is cut and the cut end is fixed to the mouth part with the adhesive tape. After alternately performing hoop winding and helical winding in the above manner, the mandrel M is detached from the supporting board 2 and the heating process is conducted to cure the resin impregnated in the fiber bundle R, thereby obtaining a pressure container including a reinforcement layer and the mandrel M.

Figure 10:
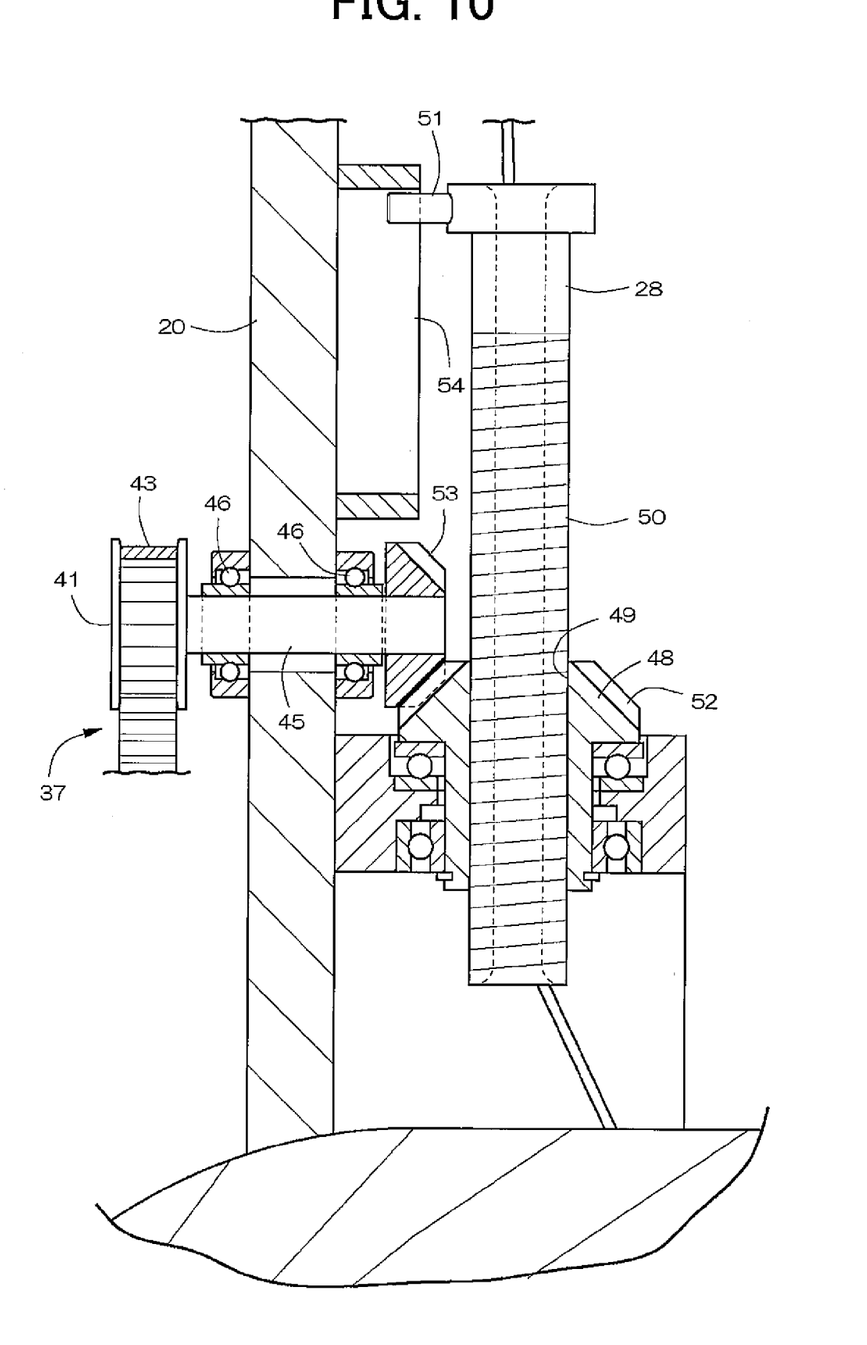
FIG. 10 is a longitudinal section front view showing another example of a tube operation mechanism according to the present invention.

FIG. 10 shows another example of a tube operation mechanism. The tube operation mechanism is configured by a female screw body 48 rotatably driven with the power transmission mechanism 37, a screw shaft 50 arranged at a tube circumferential surface of the guide tube 28 and screwed into a screw hole 49 of the female screw body 48, and a pin-shaped rotation regulating body 51 that stops the rotation of the guide tube 48. The female screw body 48 is supported in a freely rotating manner with the guide ring 27. An umbrella gear 52 integrally formed at the upper surface of screw body 48 gears with an umbrella gear 53 fixed to the gear shaft 45. The rotation regulating body 51 is fixed at the upper end of the guide tube 28, and the projecting end of rotation regulating body 51 is engaged to a vertically long hook groove 54 formed in the fixed frame 20. Other parts of the tube operation mechanism are the same or similar as in the first example, and thus the same reference numerals are used for the same members, and repeat description thereof is omitted.

Figure 11:
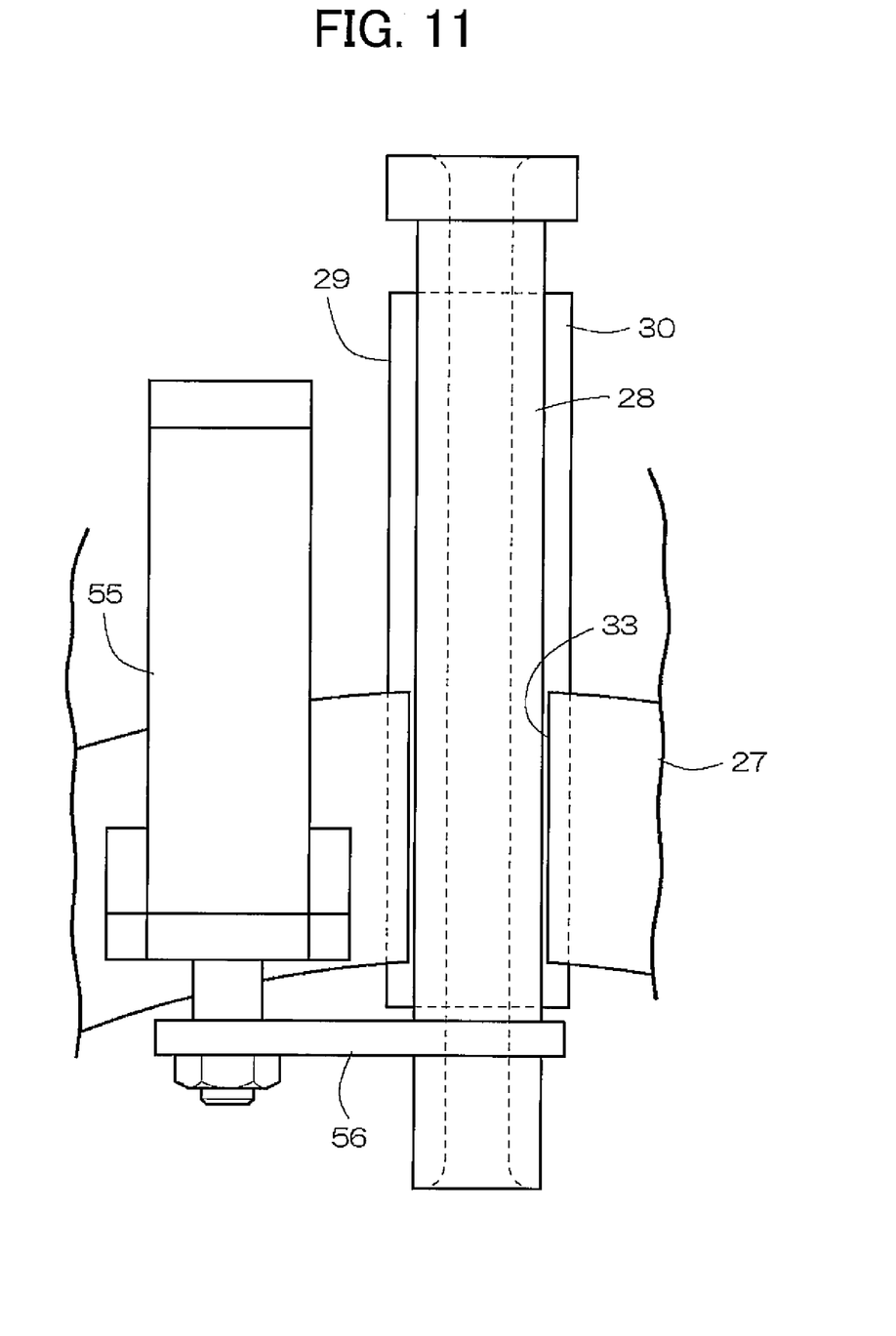
FIG. 11 is a longitudinal section front view showing a further example of a tube operation mechanism according to the present invention.

FIG. 11 shows a further example of a tube operation mechanism, wherein an air cylinder 55 is used to project and retreat the individual guide tube 28. The air cylinder 55 is attached to the guide ring 27 in an inverted orientation, and coupled to the guide tube 28 by way of a coupling plate 56 fixed at the lower end of a piston rod. By using the air cylinder 55, the guide tube 28 can be rapidly projected and retreated so that the response speed and efficient winding of fiber bundle R are enhanced. In this example, the tube operation mechanism is arranged between the guide ring 27 and the guide tube 28.

In the above example, while the drive state of the motor 36 is controlled based on the shape data of the mandrel M input and the total thickness data of the hoop wound and helical wound layers, and the like, this is not necessary. For instance, the drive state of the motor 36 may be controlled based on an output signal from a sensor contacting the circumferential surface of the mandrel M. The change in shape of the mandrel M may be detected with a non-contacting sensor. If necessary, the guide tube may be projected and retreated at the cylindrical part to change the supply position of the fiber bundle R.

While the present invention has been described with respect to specific embodiments thereof, the invention may be modified and may assume embodiments other than those specifically set out and described above. Accordingly, the appended claims cover all modifications that fall within the true spirit and scope of the present invention.

What is claimed is:

1. A filament winding apparatus comprising:
    a supporting board for supporting a mandrel that integrally includes a middle cylindrical part and a dome part continuing at both ends of the cylindrical part, and
    a helical winding head for supplying and guiding a fiber bundle towards the mandrel, wherein the helical winding head includes:
    a guide ring concentrically supported at a periphery of the mandrel,
    a group of guide tubes radially arranged along a circumferential direction of the guide ring, and
    a tube operation mechanism reciprocating the guide tube along a tube axis center direction, wherein
    the guide tube is operated to move closer to a circumferential surface of the dome part with the tube operation mechanism when the guide tube is facing the dome part,
    a movement trajectory of the guide tube that is operated by the tube operation mechanism to move closer to the circumferential surface of the dome part is a curved line form along an outer contour line of the dome part,
    the movement trajectory of the guide tube is set to a curved line form lying along the outer contour line of the dome part by matching a spacing of the guide tube and the mandrel at the cylindrical part, and a spacing of the guide tube and the mandrel at the dome part,
    the diameter of the cylindrical part increases as the winding process progresses, and
    in correspondence with the increase in the diameter of the cylindrical part, a holding position of the guide tube in a standby state is shifted radially outward.

2. The filament winding apparatus according to claim 1, wherein
    a circular opening allowing reciprocating movement of the mandrel is formed in a fixed frame that is upstanding and fixed on a mount, and the guide ring is fixed to a circumferential edge wall of the opening;
    a tube holder arranged on the guide tube is supported in a freely reciprocating sliding manner by a guide groove formed in the guide ring; and
    the tube operation mechanism is arranged between the fixed frame and the tube holder.

3. The filament winding apparatus according to claim 1, wherein
    a circular opening allowing reciprocating movement of the mandrel is formed in a fixed frame that is upstanding and fixed on a mount, and the guide ring is fixed to a circumferential edge wall of the opening;
    a tube holder arranged on the guide tube is supported in a freely reciprocating sliding manner by a guide groove formed in the guide ring; and
    the tube operation mechanism is arranged between the fixed frame and the tube holder.

4. The filament winding apparatus according to claim 1, wherein the tube operation mechanism comprises
    a rack arranged on a tube holder,
    a pinion gearing with the rack,
    a power transmission mechanism transmitting rotational power of a motor to a group of pinions, and
    a control circuit controlling a drive state of the motor.

5. The filament winding apparatus according to claim 4, wherein the control circuit controls a drive state of the motor in relation to basic data and progress data of a winding operation of the fiber around the mandrel.

6. The filament winding apparatus according to claim 5, wherein:
    the basic data comprises the diameter of the mandrel, a length of the cylindrical part, and the curved shape of the dome part; and
    the progress data comprises a total thickness of a hoop wound layer formed around the mandrel and a total thickness of a helical wound layer.

7. The filament winding apparatus according to claim 1, wherein the dome part has a semispherical shape and the movement trajectory of the guide tube is a partial circular arc shape.

8. The filament winding apparatus according to claim 1, wherein the tube operation mechanism comprises:
   a rotatably driven female screw body,
   a screw shaft arranged at a circumferential surface of the guide tube and screwed into a screw hole of the female screw body, and
   a pin-shaped rotation regulating body that stops the rotation of the guide tube.

9. The filament winding apparatus according to claim 8, wherein
   the female screw body is supported in a freely rotating manner with the guide ring, and
   an umbrella gear is integrally formed at the upper surface of the screw body and gears with an umbrella gear fixed to the gear shaft.

10. The filament winding apparatus according to claim 9, wherein
    the rotation regulating body is fixed at an upper end of the guide tube, and
    a projecting end of the rotation regulating body is engaged to a vertically long hook groove formed in a fixed frame.

11. The filament winding apparatus according to claim 1, wherein the tube operation mechanism comprises an air cylinder that projects and retreats the guide tubes.

12. The filament winding apparatus according to claim 11, wherein the air cylinder is attached to the guide ring in an inverted orientation, and is coupled to the guide tube by a coupling plate fixed at a lower end of a piston rod.

13. A method for winding fiber around a mandrel that includes a middle cylindrical part and a dome part continuing at ends of the cylindrical part, comprising:
   moving a part that supplies and guides the fiber closer to a circumferential surface of the dome part when the part that supplies and guides the fiber is facing the dome part, wherein
   a movement trajectory of the part that supplies and guides the fiber is a curved line form along an outer contour line of the dome part,
   the movement trajectory of the part that supplies and guides the fiber is set to a curved line form lying along the outer contour line of the dome part by matching a spacing of the part that supplies and guides the fiber and the mandrel at the cylindrical part, and a spacing of the part that supplies and guides the fiber and the mandrel at the dome part,
   the diameter of the cylindrical part increases as a winding process progresses, and
   in correspondence with the increase in the diameter of the cylindrical part, a holding position of the part that supplies and guides the fiber in a standby state is shifted radially outward.

14. The method according to claim 13, further comprising:
    moving the part that supplies and guides the fiber away from a circumferential surface of the cylindrical part when the part that supplies and guides the fiber is facing the cylindrical part.

15. The method according to claim 14, wherein the spacing between a guide tube and the part that supplies and guides the fiber is kept constant.

16. The method according to claim 15, wherein the part that supplies and guides the fiber is a guide tube of a helical winding head of a filament winding apparatus.

* * * * *